(12) United States Patent
Arunan

(10) Patent No.: US 8,264,991 B2
(45) Date of Patent: Sep. 11, 2012

(54) SYSTEM AND METHOD FOR IMPROVING SYMMETRY IN DATA TRANSFER IN LLC LAYER OF PEER TO PEER NFC DEVICE

(75) Inventor: Thenmozhi Arunan, Karnataka (IN)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 196 days.

(21) Appl. No.: 12/110,505

(22) Filed: Apr. 28, 2008

(65) Prior Publication Data

US 2008/0267102 A1   Oct. 30, 2008

(30) Foreign Application Priority Data

Apr. 27, 2007  (IN) .............................. 897/CHE/2007
Nov. 29, 2007  (KR) ........................ 10-2007-0122893

(51) Int. Cl.
*H04B 7/00*       (2006.01)
*H04B 7/005*    (2006.01)
(52) U.S. Cl. ........ 370/310; 370/278; 370/282; 370/311; 370/318; 455/420; 455/557; 710/51
(58) Field of Classification Search .................. 370/310, 370/278, 276, 282, 311, 338, 318; 455/420, 455/557; 710/51
See application file for complete search history.

(56) References Cited

U.S. PATENT DOCUMENTS

| | | | |
|---|---|---|---|
| 6,917,598 B1 * | 7/2005 | Emeott et al. ................. | 370/311 |
| 2004/0095964 A1 * | 5/2004 | Meylan et al. ................ | 370/506 |
| 2005/0018624 A1 * | 1/2005 | Meier et al. ................... | 370/318 |
| 2006/0135145 A1 * | 6/2006 | Redi ............................. | 455/420 |
| 2007/0073929 A1 * | 3/2007 | Takayama et al. ............. | 710/51 |
| 2008/0291852 A1 * | 11/2008 | Abel ............................ | 370/296 |

FOREIGN PATENT DOCUMENTS

EP   1533914 A2   5/2005

OTHER PUBLICATIONS

International Standard ISO/IEC; Information Technology—Telecommunications and Information Exchange Between Systems—Near Field Communication—Interface and Protocol (NFCIP-1); vol. 18092, 1$^{st}$ Edition; Apr. 1, 2004; XP007905654.
Meier, Robert C, et al.; Patent Application Publication No. US 2005/0018624 Al; Publication Date: Jan. 27, 2005; "Uniform Power Save Method for 802.11E Stations;" . . . .
Janczak, Tomasz; Patent Application Publication No. US 2005/0135409 A1; Publication Date: Jun. 23, 2005; "Polling in Wireless Networks;" . . . .

* cited by examiner

*Primary Examiner* — Michael Thier
*Assistant Examiner* — Jamal Javaid
(74) *Attorney, Agent, or Firm* — Cha & Reiter, LLC

(57) ABSTRACT

A data transmission/reception method in Near Field Communications (NFC) for improving data throughput is provided. Communications between a first NFC device and a second NFC device which perform NFC includes (a) transmitting, by the first NFC device, a data frame to the second NFC device, (b) setting, by the second NFC device, an indication of presence or absence of more-data in a bit of a Logical Link Control (LLC) information frame and transmitting the LLC information frame as a response frame responding to the data frame transmitted from the first NFC device, and (c) checking, by the first NFC device, the bit of the response frame and waiting for predetermined time or immediately transmitting a next transmission data bit without waiting for the predetermined time according to the check result.

6 Claims, 2 Drawing Sheets

SYSTEM AND METHOD FOR IMPROVING SYMMETRY IN DATA TRANSFER IN LLC LAYER OF PEER TO PEER NFC DEVICE

CLAIM OF PRIORITY

This application claims the benefit of priority under 35 U.S.C. §119(a) of a Korean Patent Application filed in the Korean Intellectual Property Office on Nov. 29, 2007 and assigned Serial No. 2007-122893, and from an Indian Patent Application in the Office of the Controller General of Patents, Designs, and Trademarks on Apr. 27, 2007 and assigned Serial No. IN 897/CHE/2007, the entire disclosures of both of which are hereby incorporated by reference.

BACKGROUND OF THE INVENTION

1. Field of the Invention

The present invention relates to a data transmission/reception method in Near Field Communications (NFC). More particularly, the present invention to a method for improving data throughput between devices.

2. Description of the Related Art

Near Field Communications (NFC) are used for communications between devices that are spaced from each other typically within about 10 cm. In NFC protocol stacks, the NFCIP-1 standard is used on physical layers of ISO 14443. In NFCIP-1, the devices used for the NFC (or NFCIP-1 devices) may operate in an Active mode or a Passive mode. An NFCIP-1 device in a transmission mode is referred to as an initiator and an NFCIP-1 device in a reception mode is referred to as a target.

In the Passive mode, an NFCIP-1 device does not have its own power source that is required for modulation of its own Radio Frequency (RF) field and thus cannot generate a request message by itself. In the Passive mode, a communication is started by the initiator at all times. In other words, once the initiator in Active mode sends a request message through the RF field, the target in a Passive mode drives a receiver circuit with the power source provided through the RF field. If the initiator does not have transmission data, the initiator periodically transmits a symmetry (SYMM) frame to at least one target. In response to receiving the SYMM frame or an Information (I) frame from the initiator, the target sends back to the initiator the received frame having inserted its own data therein. Thus, the throughput, i.e., data transfer rate, of data transmitted from the target depends on the frequency of the I frame or the SYMM frame received from the initiator.

Moreover, in a current Logical Link Control Protocol (LLCP) version, the initiator has to wait a period of time for reception of a response frame after transmitting a request frame. Due to such a wait, data transfer may be delayed by the response waiting time (RWT). In this mechanism, a unidirectional data transfer from the target inevitably relies on a frequency used for SYMM frame transmission from the initiator to the target.

As a result of the RWT discussed above, when the amount of data to be transmitted between NFC devices increases, a data transfer rate between the NFC devices decreases due to unnecessary idle time or waiting time.

To solve those problems, there is a need for a fundamental method for improving the data transfer rate between NFC devices.

SUMMARY OF THE INVENTION

An aspect of the present invention is to address at least some of the above problems and/or disadvantages and to provide at least the advantages described below. Accordingly, an aspect of the present invention is to provide a method for reducing unnecessary waiting time generated during data transmission/reception between Near Field Communication (NFC) devices.

According to an exemplary aspect of the present invention, there is provided a method for improving symmetry in data transfer in a Logical Link Control (LLC) layer of peer to peer Near Field Communications (NFC) devices, wherein a bit in an LLC Information frame is set to '0' or '1' and is used as a more-data bit indicator.

The more-data bit indicator may be set when a target or an initiator has one or more data frames to be transmitted to the initiator or to the target.

For example, upon receipt of an Information (I) frame, a target (or an initiator) having received the I frame, checks whether the bit is set, and if the bit is set, and there are no other frames to be transmitted by the target or the initiator, the target or the initiator sends a symmetry (SYMM) frame immediately without waiting for an idle timer indicative of a SYMM timer to expire.

In addition, according to an exemplary aspect of the invention, an initiator may initiate an idle timer and wait for the idle timer to expire before sending a first SYMM frame to a target.

An initiator may receive a first response frame where the bit is set to '0' from a target and starts an idle timer for SYMM frame transmission.

According to another exemplary aspect of the present invention, there is provided a method for communications between a first Near Field Communications (NFC) device and a second NFC device which communicate by using NFC. The method includes the exemplary steps of (a) transmitting, by the first NFC device, a data frame to the second NFC device; (b) setting, by the second NFC device, an indication of presence or absence of more data in a bit of a Logical Link Control (LLC) information frame and transmitting the LLC information frame as a response frame responding to the data frame transmitted from the first NFC device; and (c) checking, by the first NFC device, the bit of the response frame, and waiting for predetermined time or immediately transmitting a next transmission data bit without waiting for the predetermined time according to the check result.

The LLC information frame may include an Information (I) frame and an Unnumbered Information (UI) frame.

The bit may comprise, for example, a $4^{th}$ bit of a control field.

According to an exemplary aspect of the invention, if the bit is set to '0' in (b), the first NFC device may transmit a next frame after waiting for the predetermined time in (c), and if the bit is set to '1' in (b), the first NFC device may immediately transmit the next frame without waiting for the predetermined time in (c).

The data frame may comprise, for example, an SYMM frame and the LLC information frame may comprise a response frame responding to the SYMM frame.

BRIEF DESCRIPTION OF THE DRAWINGS

The above and other features and advantages of an exemplary embodiment of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION

The matters defined in the description such as a detailed construction and elements are provided to assist a person of ordinary skill in the art with a comprehensive understanding of an exemplary embodiment of the invention. The examples contained herein are provided for illustrative purposes and do not limit the invention to the examples provided herein. Accordingly, those of ordinary skill in the art will recognize that various changes and modifications of the exemplary embodiment described herein can be made without departing from the scope and spirit of the invention. In addition, descriptions of known functions and configurations may be omitted so as not to obscure appreciation of the invention by a person of ordinary skill in the art.

Near Field Communications (NFC) may be performed by data transmission/reception between an initiator and a target. The initiator periodically generates and outputs a Radio Frequency (RF) field including a symmetry (SYMM) frame. Once the target moves into a region of the RF field, the target then operates by using an RF signal received from the initiator as a power source. The target load-modulates the RF signal, thereby sending back a response frame when responding to the SYMM frame.

Figure 1:
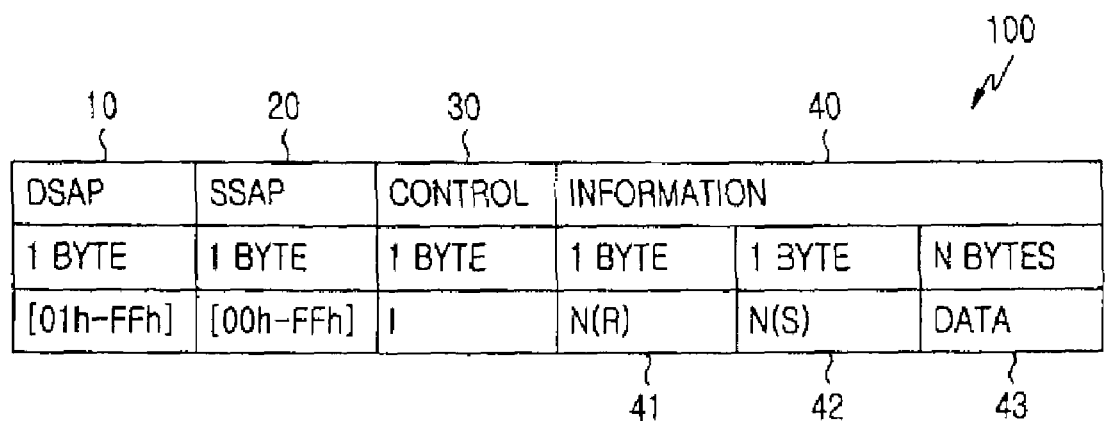
FIG. 1 illustrates the structure of an Information (I) frame generated according to an exemplary embodiment of the present invention.
Figure 2:
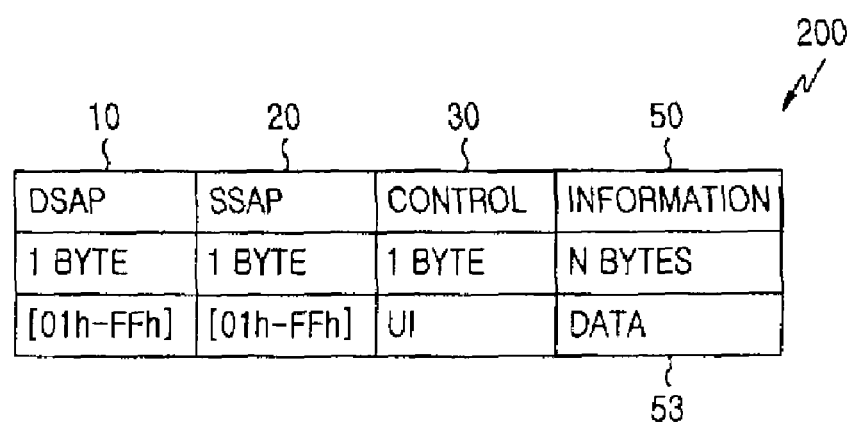
FIG. 2 illustrates the structure of an Unnumbered Information (UI) frame generated according to an exemplary embodiment of the present invention.

FIG. 1 illustrates the structure of an Information (I) frame 100 generated according to an exemplary embodiment of the present invention, and FIG. 2 illustrates the structure of an Unnumbered Information (UI) frame 200 generated according to an exemplary embodiment of the present invention. Referring to FIGS. 1 and 2, each of the I frame 100 and the UI frame 200 according to an exemplary embodiment of the present invention includes a Destination Service Access Point (DSAP) field 10 including an address of a destination, a Source Service Access Point (SSAP) field 20 including an address of a source, a control field 30, and a data information field 40 (for the I frame) or 50 (for the UI frame).

For both the I frame 100 and the UL frame 200, the DSAP field 10, the SSAP field 20, and the control field 30 typically have the same sizes and structures. On the other hand, the respective data information fields 40 and 50 are set differently for the I frame 100 and the UI frame 200. More specifically, the data information field 40 included in the I frame 100 is composed of a field 43 for recording a plurality of data packet units and a field 42 for recording a sequence number of a first transmitted data packet unit (or first data packet unit). The data information field 40 of the I frame may further include a field 41 for recording a response sequence number that is set to correspond to a sequence number of a last data packet unit.

Still referring to FIG. 1, the response sequence number may be set to correspond to the last data packet unit that is included last among data packet units included in a payload of the data information field 40. The response sequence number may be a value increased by, for example, the sequence number of the last included data packet unit (or last data packet unit), including but not limited to an increase of one. For example, it is assumed that the data information field 40 of the I frame includes aggregated 3 data packet units and the field 42 for recording the sequence number of the first data packet unit is set to 4. Typically, the three data packet units included in the data information field 40 are sequentially assigned sequence numbers based on the sequence number of the first data packet unit. Thus, for example, in the data information field 40, the sequence number of the last data packet unit may be 6. In the field 41, the response sequence number may be set to 7 that is a value increased by one from the sequence number of the last data packet unit, i.e., 6. A person of ordinary skill in the art should understand and appreciate that the invention could use values other than one a given sequence.

Referring now to FIG. 2, unlike in the I frame 100 shown in FIG. 1, the data information field 50 of the UI frame 200 includes only a plurality of data packet units instead of fields for recording sequence numbers.

Figures 3, 4:
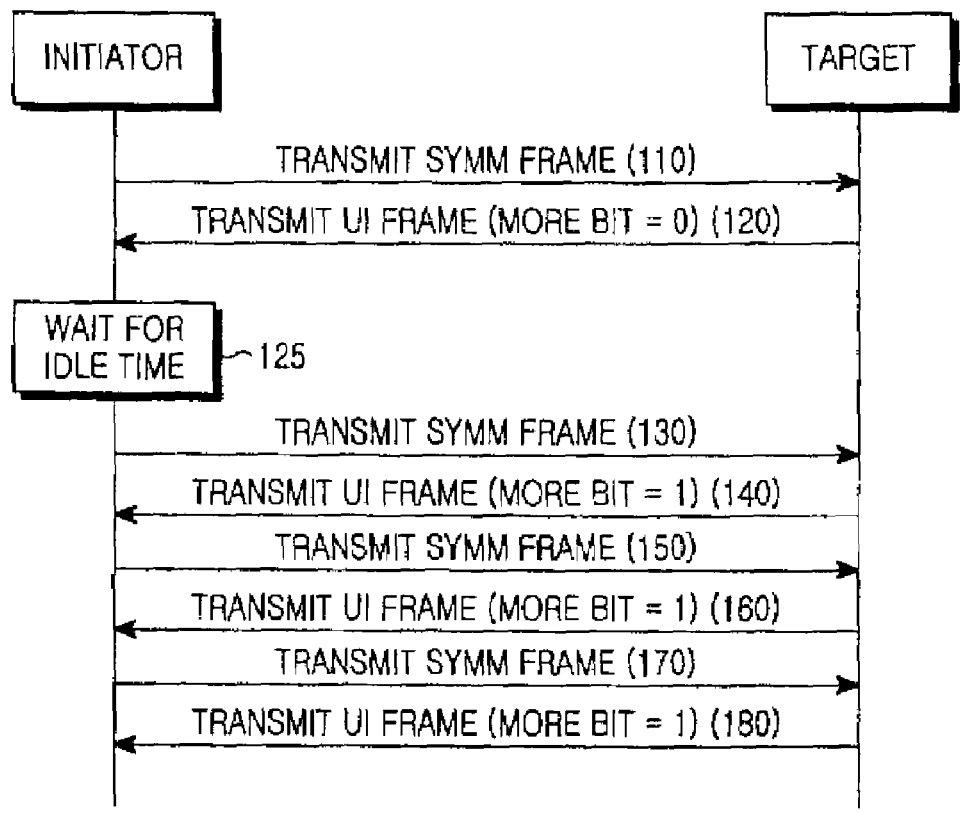
FIG. 3 illustrates the structure of a control field according to an exemplary embodiment of the present invention.
FIG. 4 is a ladder diagram illustrating a data transmission/reception method according to an exemplary embodiment of the present invention.

FIG. 3 illustrates some exemplary details of the structure of the control field 30 according to an exemplary embodiment of the present invention. The control field 30 included in both the I frame 100 and the UI frame 200 typically has a size of 1 byte, in which a command is recorded in $0^{th}$-$3^{rd}$ bits (indicated by reference numeral 31).

In the present invention, an indicator provides an indication as to whether a more-data frame is present in a transmission que of a transmission device is added. Thus, in the exemplary embodiment of the present invention, the presence or absence of more-data is indicated in the I frame 100 or the UI frame 200 by using a $4^{th}$ bit (indicated by reference numeral 32) that is not separately defined in the LLCP specification. Information recorded in the $4^{th}$ bit may be defined as follows.

TABLE 1

| Control value | Indicating information |
|---|---|
| 0 | Absence of more-data frame(s) |
| 1 | Presence of more-data frame(s) |

In Table 1, '0' indicates that a more-data frame is present in a transmission queue of a transmission device and '1' indicates that the more-data frame is absent from the transmission queue of the transmission device.

Information for indicating a frame type is recorded, for example, in $5^{th}$ and $6^{th}$ bits (indicated by reference numeral 33) of the control field 30. The recorded information may be defined as follows:

TABLE 2

| Control value | Indicating information |
|---|---|
| 00 | Supervisory |
| 01 | UI frame |
| 10 | 1 frame |
| 11 | Other |

In Table 2, '00' indicates a supervisory signal used to indicate several operational states of circuit combinations or apply changes, '01' indicates that a corresponding frame is an UI frame, and '10' indicates that a corresponding frame is an I frame. As such, it can be identified whether a corresponding data frame is an I frame or an UI frame by using the $5^{th}$ and $6^{th}$ bits of the control field 30.

A description will now be made of a data transmission/reception method using the foregoing data frame structure according to an exemplary embodiment of the present invention.

FIG. 4 is a ladder diagram of a data transmission/reception method according to an exemplary embodiment of the present invention. Referring to FIG. 4, an initiator periodically transmits an SYMM frame to a target in step 110, and the target sends back an UI frame to the initiator as a response to the SYMM frame that is periodically received from the initiator. If a Logical Link Control (LLC) layer does not have a more-data frame, the target transmits the LLC UI frame to the initiator after setting a $4^{th}$ bit of a control field to '0' in step 120.

In step 130, upon receipt of the UI frame from the target, the initiator then transmits the SYMM frame to the target.

Still referring to FIG. 4, according to this exemplary data transmission/reception method of the present invention, preferably, the data transmission/reception method may include a step 125 prior to step 130. In step 125, the initiator, perceiving that the $4^{th}$ bit of the control field of the received UI frame is set to '0', initiates an SYMM timer, and waits for predetermined idle time until the SYMM timer expires.

If the LLC layer includes data frames of one or more application levels, the target transmits the LLC UI frame to the initiator after setting the $4^{th}$ bit of the control field of the LLC UI frame to '1' in step 140.

In response, the initiator, perceiving that the $4^{th}$ bit of the control field included in the received UI frame is set to '1', transmits the SYMM frame immediately without waiting for the idle time in step 150.

In FIG. 4, steps 150 through 180 may correspond to steps 130 and 140.

Moreover, a parameter as to whether a more-bit indication suggested by the present invention is supported may be included in initial parameter negotiation, and this method can be applied variously by those of ordinary skill in the art.

In an exemplary embodiment of the present invention a target transmits an indication as to whether a more-data frame is present in response to a frame received from an initiator by typically using a $4^{th}$ bit of a control field of an UI frame. However, the present invention is not limited to the above examples. For example, although the target transmits an indication as to whether a more data frame is present to the initiator by using the UI frame, it may also use an I frame for transmission of the indication. Moreover, although the target transmits a response frame including a more-data bit indicator in response to an SYMM frame received from the initiator, it may include the more-data bit indicator in the I or UI frame transmitted from the initiator. Furthermore, although it is indicated by using the $4^{th}$ field of the control field whether the more data frame is present, other redundant bits may also be used for the indication. Both the initiator and the target are capable of transmitting a frame including the more-data bit indicator.

While the invention has been shown and described with reference to exemplary embodiments thereof, it will be understood by those skilled in the art that various changes in form and details may be made therein without departing from the spirit and scope of the invention.

What is claimed is:

1. A method for improving symmetry in data transfer in a Logical Link Control (LLC) layer of peer-to-peer Near Field Communications (NFC) devices, including the steps of:

periodically transmitting, by an initiator NFC device, first symmetry (SYMM) frames for a power source to drive a target NFC device based on a predetermined idle time;

receiving a response frame comprising an LLC Information frame including a more-data bit indicator set by the target NFC device and checking the more-data bit to determine whether to immediately transmit a second SYMM frame; and when a value of the more-data bit indicator is set to 1 to indicates that there is another frame to be transmitted to the initiator NFC device by the target NFC device, sending the second SYMM frame to said target NFC device immediately after receiving the response frame and without waiting for the predetermined idle time;

when the value of the more-data bit indicator is set to 0 to indicates that there is no other frame to be transmitted to the initiatory NFC device by said target NFC device, sending the second SYMM frame to the target NFC device after waiting for the predetermined idle time;

wherein the both of said initiator NFC device and said target NFC device are configured for setting the more-data bit indicator.

2. The method of claim 1, wherein the initiator NFC device starts an idle timer and waits for the idle timer to expire.

3. The method of claim 1, wherein when the more-data bit is set to '0', the initiator NFC device initiates an idle timer for SYMM frame transmission.

4. The method of claim 1, wherein the LLC information frame is one of an Information (I) frame and an Unnumbered Information (UI) frame.

5. A method for improving symmetry in data transfer in a Logical Link Control (LLC) layer of peer-to-peer Near Field Communications (NFC) devices, including the steps of:

periodically receiving, by a target NFC device, first symmetry (SYMM) frames for providing a power source to drive a target device from an initiator NFC device based on a predetermined idle time;

setting a more-data bit indicator;

transmitting a response frame comprising the more-data bit indicator to the initiator NFC device;

wherein the more-data bit indicator indicates whether there is another frame to be transmitted or not;

when a value of the more-data bit indicator is set to 1 to indicates that there is another frame to be transmitted to the initiator NFC device by the target NFC device, receiving a second SYMM frame from said initiator NFC device immediately after transmitting the response frame and without waiting for the predetermined idle time;

when a value of the more-data bit indicator is set to 0 to indicates that there is no other frame to be transmitted to the initiator NFC device by the target NFC device, receiving the second SYMM frame from said initiator NFC device after waiting for the predetermined idle time;

wherein the both of said initiator NFC device and said target NFC device are configured for setting the more-data indicator.

6. The method of claim 5, wherein the response frame comprises one of an Information (I) frame and an Unnumbered Information (UI) frame.

* * * * *

UNITED STATES PATENT AND TRADEMARK OFFICE
CERTIFICATE OF CORRECTION

| | | |
|---|---|---|
| PATENT NO. | : 8,264,991 B2 | Page 1 of 1 |
| APPLICATION NO. | : 12/110505 | |
| DATED | : September 11, 2012 | |
| INVENTOR(S) | : Thenmozhi Arunan | |

It is certified that error appears in the above-identified patent and that said Letters Patent is hereby corrected as shown below:

In the Claims:

Column 6, Claim 1, Lines 9-10 should read as follows:
--...to indicate that there is...--

Column 6, Claim 1, Lines 15-16 should read as follows:
--...to indicate that there is...--

Column 6, Claim 5, Lines 43-44 should read as follows:
--...to indicate that there is...--

Column 6, Claim 5, Lines 50-51 should read as follows:
--...to indicate that there is...--

Signed and Sealed this
Twenty-third Day of April, 2013

Teresa Stanek Rea
*Acting Director of the United States Patent and Trademark Office*